June 3, 1941.    M. V. SUMMERS    2,244,646
PLANTER AND FERTILIZER DISTRIBUTOR
Filed July 15, 1939    3 Sheets-Sheet 1
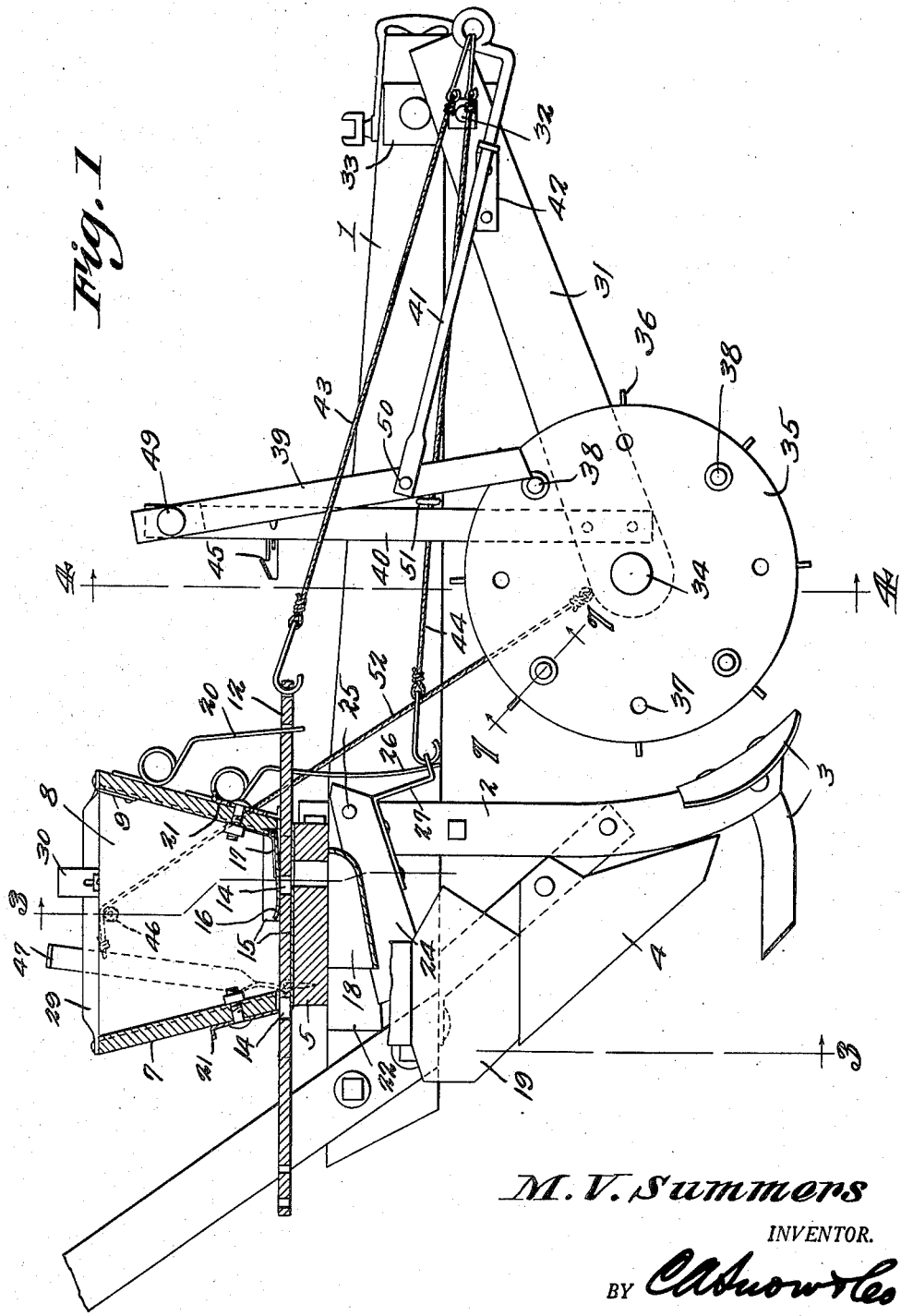
M. V. Summers
INVENTOR.
BY CASnowles
ATTORNEYS.

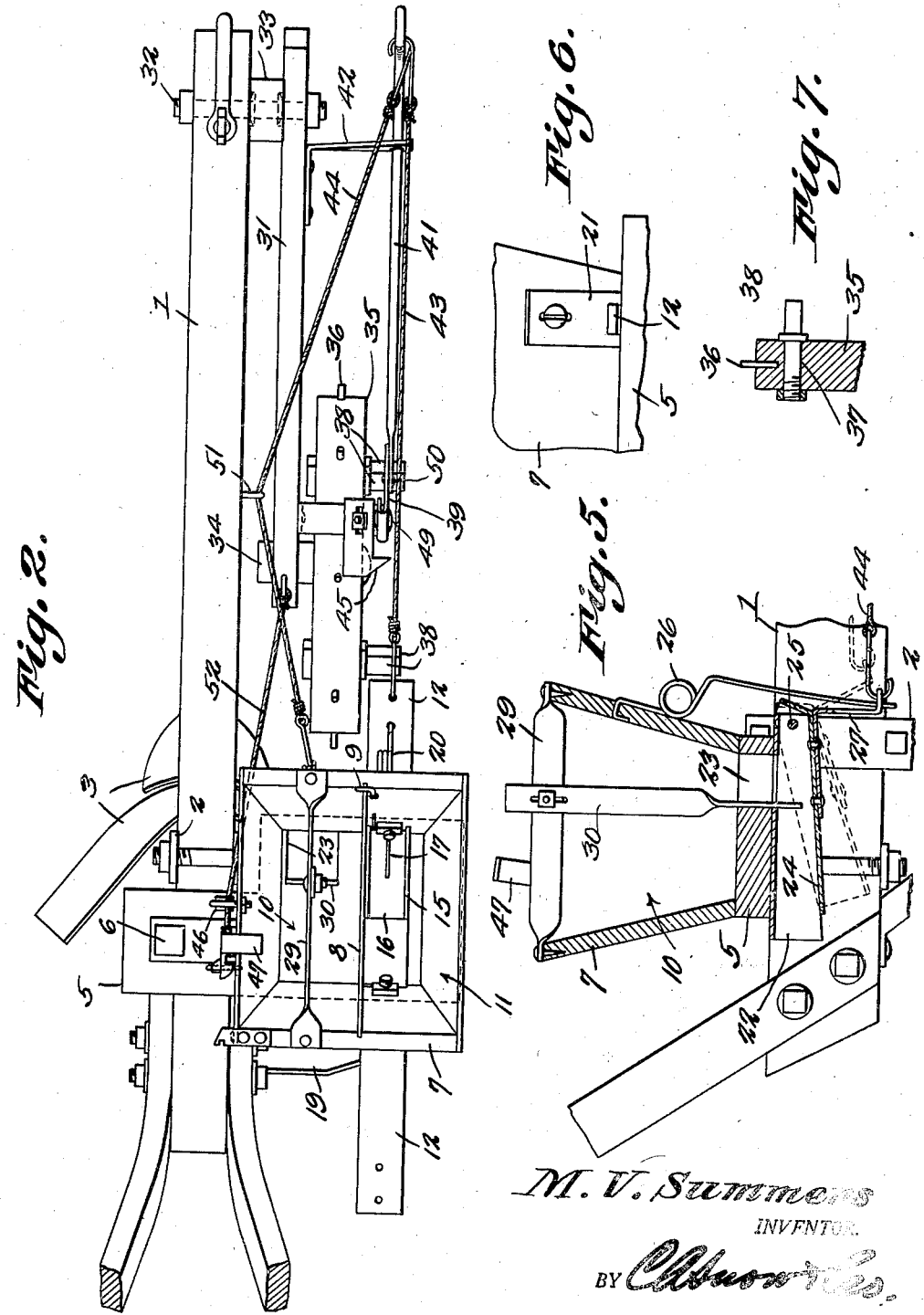

June 3, 1941.  M. V. SUMMERS  2,244,646
PLANTER AND FERTILIZER DISTRIBUTOR
Filed July 15, 1939   3 Sheets-Sheet 3
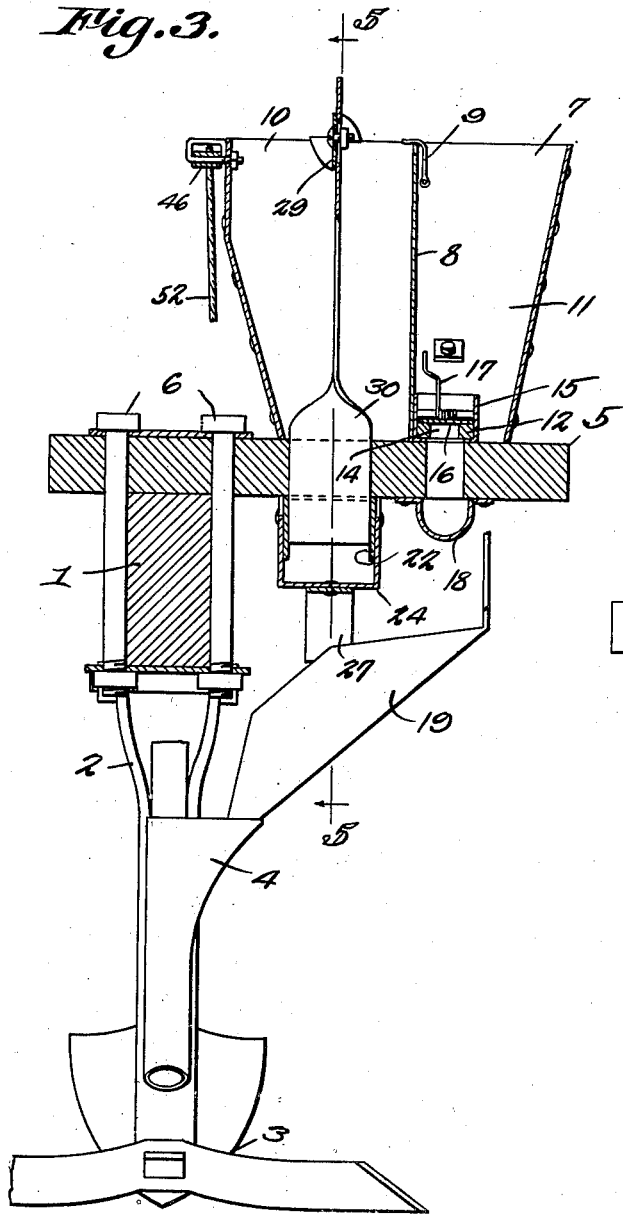
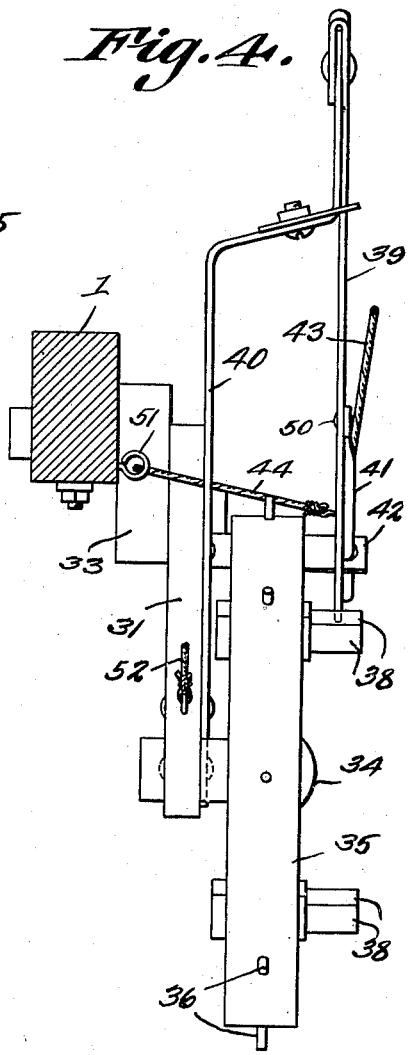
M. V. Summers
INVENTOR.
BY *(signature)*
ATTORNEYS.

Patented June 3, 1941

2,244,646

UNITED STATES PATENT OFFICE 2,244,646

PLANTER AND FERTILIZER DISTRIBUTOR

Martin Vandver Summers, Kirbyville, Tex.

Application July 15, 1939, Serial No. 284,774

2 Claims. (Cl. 275—2)

This invention aims to provide a simple but effective means whereby seed and fertilizer may be dropped at intervals in the wake of the soil-engaging element of a plow, the device being so constructed that it can be attached readily to almost any make of plow, novel means being supplied whereby there is a control over the dropping of the seed and the distribution of the fertilizer.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 is a side elevation of the device attached to a plow, some parts being in section and other parts broken away;

Fig. 2 is a top plan;

Fig. 3 is a section on the line 3—3 of Fig. 1;

Fig. 4 is a section on the line 4—4 of Fig. 1;

Fig. 5 is a section on the line 5—5 of Fig. 3;

Fig. 6 is an elevation showing part of the hopper and attendant parts;

Fig. 7 is a section on the line 7—7 of Fig. 1.

The numeral 1 marks a support, preferably a plow beam, carrying a depending standard 2, to which a soil-engaging means 3 is attached. A delivery member 4, supported from the standard 2 and from the beam 1 discharges in the wake of part of the soil-engaging means 3.

Figure 3 shows that a cross arm or bracket 5 is detachably connected at 6 to the beam 1, the bracket forming the bottom of a hopper 7 in which a vertically removable dividing wall 8 is held by a latch 9 on the hopper, the wall forming, in the hopper, a fertilizer compartment 10 and a seed compartment 11.

Obedient to the showing of Fig. 1, a gate 12 is mounted for horizontal linear reciprocation in the lower part of the hopper 7. The gate 12 slides back and forth, and has holes 14 of different sizes, either one of the holes being brought into operation by taking out the slide and turning it end-for-end. Because the holes 14 are of different size, different sorts of seed may be handled readily. A guide trough 15 is secured to the bracket 5, within the seed compartment 11 of the hopper 7, and the gate 12 reciprocates in the trough. A valve strip 16 is hinged to the trough 15 and is pressed down on the gate 12 by a spring 17 secured to the forward wall of the hopper 7. A spout 18 is secured to the bottom of the bracket 5 and takes seed from the compartment 11 by way of the selected hole 14 in the gate 12, the spout discharging the seed into a lateral chute 19, supported from the bracket 5, the chute discharging into the delivery member 4.

A spring arm 20, attached to the hopper 7, retracts the gate 12 until the appropriate hole 14 is filled with seed, and when the gate is advanced, by a means to be described hereinafter, the seed in the hole passes into the spout 18, and thence into the chute 19, the seed being delivered into the member 14 in the wake of part of the soil-engaging means 3. It has been stated hereinbefore that, by turning the gate 12 end-for-end, the other hole 14 may be brought into play, and thus the gate can handle seed that is either large or small. The gate 12 reciprocates in vertically adjustable bearing strips 21 (Fig. 6) secured to the front and rear walls of the hopper 7.

Figures 5 and 3 show that an inverted, trough-shaped receiver 22 is secured to the bracket 5, and receives fertilizer from the compartment 10 of the hopper 7, through an opening 23 in the bracket 5. A trough-shaped dump 24 has its forward end pivoted at 25 to the receiver 22. The dump 24 is raised to closed position by a spring arm 26, mounted on the hopper 7 and engaged with a bracket 27 fastened to the pivoted end of the dump 24. A cross bar 29 is secured to the top of the hopper 7, and to the cross bar is attached, for vertical adjustment, a baffle 30 that extends downwardly through the opening 23 of the bracket 5, into the receiver 22. The baffle 30 regulates the amount of fertilizer that is let go by the dump 24, as the dump is swung down.

A backwardly extended and downwardly inclined wheel carrier or bar 31 is pivoted at 32 for vertical movement, on a hanger block 33 attached to the forward end of the plow beam 1. The rear end of the carrier 31 supports an axle 34 on which a drive wheel 35 is journaled, the drive wheel having peripheral spurs 36 which enhance its hold on the ground. The drive wheel 35 is supplied with a circle of openings 37, in which cross pins 38 are removably mounted, as shown in Fig. 7.

As the pins 38 on the drive wheel 35 move in an orbit, they engage the lower end of a radius arm 39, having its upper end pivoted at 49 to the upper end of an upright 40, secured at its lower end to the wheel carrier 31. A stop 45 on the upright 40 limits the backward swinging movement of the radius arm 39. The back end of a pitman 41 is pivoted at 50 to the radius arm 39, near the lower end of the radius arm, and the pitman slides in a guide 42 on the forepart of the carrier 31, a little behind the pivotal mounting 32 of the wheel carrier. The front end of a flexible element 43 is detachably hooked into the forward end of the pitman 41, the back end of the flexible element being detachably hooked into the forward end of the gate 12. The forward end of a flexible element 44 is detachably hooked into the forward end of the pitman 41, and the back end of the flexible element is detachably hooked into the bracket 27 on the dump 24 that swings vertically with respect to the receiver 22. The flexible element 44 extends laterally, as shown in Fig. 2, and is rove slidably through a guide 51 on the plow beam 1.

To the back part of the wheel carrier 31 is anchored an upwardly extended flexible element 52, passed over a pulley 46 on the side of the hopper 7, the rear end of the flexible element being attached to an upwardly extended lever 47, under the control of an operator, and fulcrumed on the bracket 5.

When the ground wheel 35 is rotated, the pins 38 swing the radius arm 39, reciprocation is imparted to the pitman 41, the flexible element 43 operates the slide 12, and the flexible element 44 operates the dump 24, both seed and fertilizer being deposited. If seed alone is required, the flexible element 44 is cast free, and if fertilizer alone is required, the flexible element 43 is cast free. The operation of the radius arm 39 and parts associated with it may be regulated by taking some of the pins 38 out of the ground wheel 35, or by shifting them in the holes 37. When it is desired that the drive wheel or ground wheel 35 shall not rotate to actuate the parts associated with it, this can be done by raising the wheel carrier 31, through the instrumentality of the flexible element 52 and the lever 47.

Having thus described the invention, what is claimed is:

1. In a distributor for soil tilling agricultural implements, a hopper, an outlet control for the hopper, means for mounting the hopper on a plow beam, a rearwardly extended wheel carrier, means for pivoting the forward portion of the wheel carrier to a plow beam, to permit the rear portion of the wheel carrier to be raised and lowered, means under the control of an operator for raising and lowering the wheel carrier, a ground wheel journaled on the wheel carrier and having projections, an upright on the wheel carrier, a depending radius arm having its upper portion pivoted to the upright, the lower portion of the radius arm extending into the path of the projections, a forwardly extended pitman having its rear end pivoted to the radius arm, means for guiding the pitman on the wheel carrier, and a connection between the pitman and the outlet control.

2. In a distributor for soil tilling agricultural implements, a support, a hopper, an outlet control for the hopper, means for mounting the hopper on the support, a rearwardly extended wheel carrier, means for pivoting the forward portion of the wheel carrier to the support, to permit the rear portion of the wheel carrier to be raised and lowered, means under the control of an operator for raising and lowering the wheel carrier, a ground wheel journaled on the wheel carrier and having projections, an upright on the wheel carrier, a depending radius arm having its upper portion pivoted to the upright, the lower portion of the radius arm extending into the path of the projections, a forwardly extended pitman having its rear end pivoted to the radius arm, means for guiding the pitman on the wheel carrier, and a connection between the pitman and the outlet control.

MARTIN VANDVER SUMMERS.